(12) United States Patent
Han et al.

(10) Patent No.: US 8,433,165 B2
(45) Date of Patent: Apr. 30, 2013

(54) OPTICAL-ELECTRICAL HYBRID TRANSMISSION CABLE

(75) Inventors: Wen-Du Han, Kunshan (CN); Wei Yao, Kunshan (CN); Pei Tsao, La Harbra, CA (US)

(73) Assignee: Hon Hai Precision Ind. Co., Ltd., New Taipei (TW)

( * ) Notice: Subject to any disclaimer, the term of this patent is extended or adjusted under 35 U.S.C. 154(b) by 345 days.

(21) Appl. No.: 12/830,461

(22) Filed: Jul. 6, 2010

(65) Prior Publication Data

US 2012/0008905 A1    Jan. 12, 2012

(51) Int. Cl.
    *G02B 6/44*    (2006.01)
(52) U.S. Cl.
    USPC .......................................................... 385/101
(58) Field of Classification Search .................... 385/101
    See application file for complete search history.

(56) References Cited

U.S. PATENT DOCUMENTS

| 6,738,547 B2 * | 5/2004 | Spooner ......................... 385/101 |
| 6,967,584 B2 * | 11/2005 | Maki .............................. 340/657 |
| 7,643,713 B2 | 1/2010 | Buthe et al. |

* cited by examiner

*Primary Examiner* — Jerry Rahll
(74) *Attorney, Agent, or Firm* — Wei Te Chung; Ming Chieh Chang

(57) ABSTRACT

An optical-electrical hybrid transmission cable (100), comprises: an insulative layer (2); a shielding layer (3) located on an inner side of the insulative layer; an optical cable (4) disposed in the shielding layer and comprising two optical fibers (41) and an insulative sheath (42) enclosing the two optical fibers; two coaxial cables (5), a power wire (6) and a grounding wire (7) disposed in the shielding layer; and a filler (8) disposed in a center of the optical-electrical hybrid transmission cable and surrounded by the two coaxial cables, the power wire, the grounding wire and the optical cable which are arranged along a circumferential direction.

16 Claims, 2 Drawing Sheets

OPTICAL-ELECTRICAL HYBRID TRANSMISSION CABLE

FIELD OF THE INVENTION

The present invention relates to a cable, and more particularly to an optical-electrical hybrid transmission cable.

DESCRIPTION OF PRIOR ART

Recently, as the data transmitting rate between the PC and PC or PC and external electrical device is required faster and faster, the traditional cable connecting with the PC and PC or PC and external device can not meet the high data transmitting rate requirements.

As discussed above, an improved optical-electrical hybrid transmission cable overcoming the shortages of existing technology is needed.

SUMMARY OF THE INVENTION

Accordingly, an object of the present invention is to provide optical-electrical hybrid transmission cable with high speed signals transmission.

In order to achieve the above-mentioned objects, an optical-electrical hybrid transmission cable, comprises: an insulative layer; a shielding layer located on an inner side of the insulative layer; an optical cable disposed in the shielding layer and comprising two fibers and an insulative sheath enclosing two optical fibers; two coaxial cables, a power wire and a grounding wire disposed in the shielding layer; and a filler disposed in a center of the optical-electrical hybrid transmission cable and surrounded by the two coaxial cables, the power wire, the grounding wire and the optical cable which are arranged along a circumferential direction.

Other objects, features and advantages of the invention will be apparent from the following detailed description taken in connection with the accompanying drawings.

DETAILED DESCRIPTION OF PREFERRED EMBODIMENTS

Figure 1:
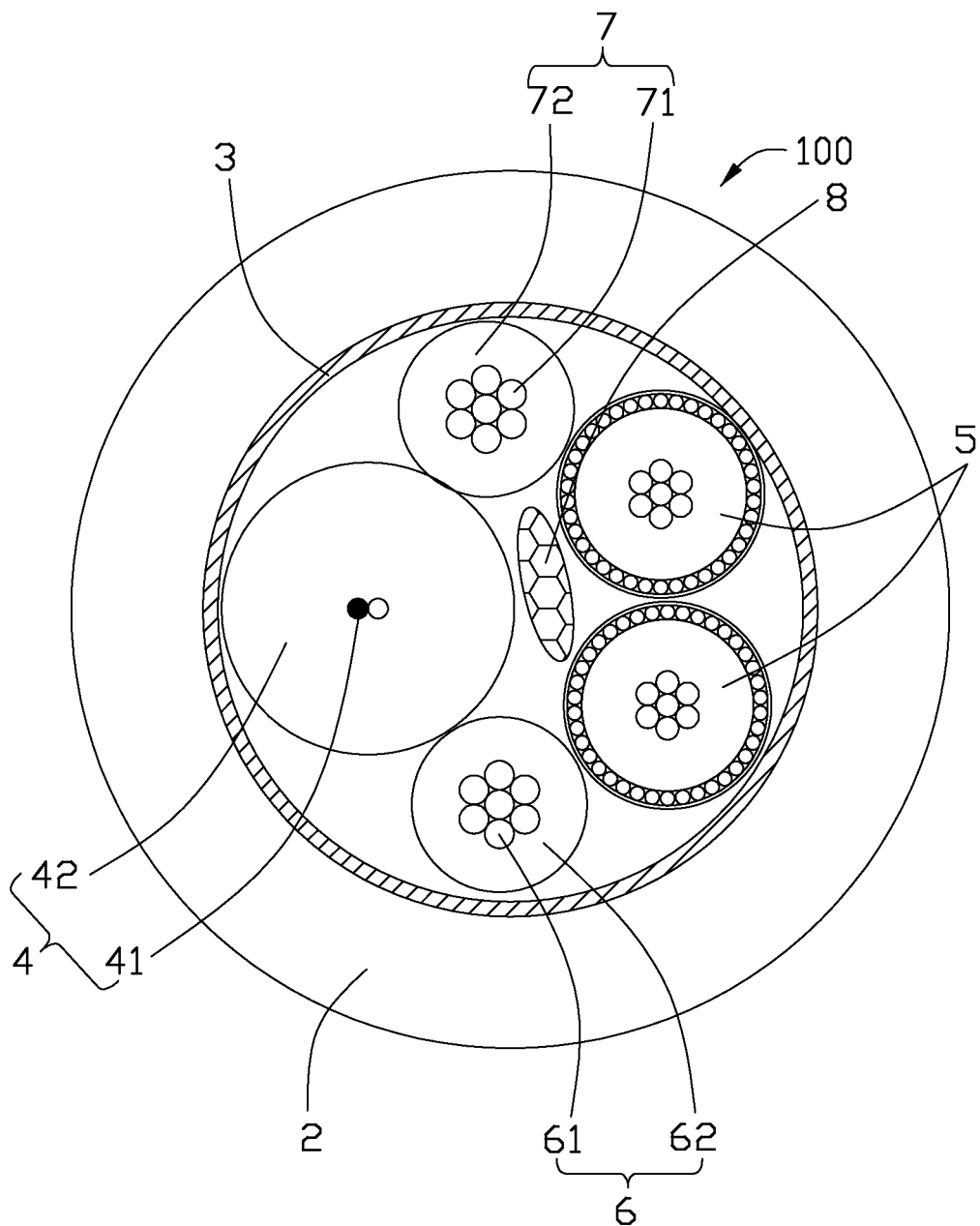
FIG. 1 is a cross-section view of an optical-electrical hybrid transmission cable in accordance with the present invention.

Reference will now be made to the drawing figures to describe the present invention in detail.

Referring to FIG. 1, an optical-electrical hybrid transmission cable 100 in accordance with the present invention comprises an insulative layer 2 and a shielding layer 3 from outside to inside, and an optical cable 4, two coaxial cables 5, a power wire 6 and a grounding wire 7 disposed in the shielding layer 3 and arranged along a circumferential direction. The optical-electrical hybrid transmission cable 100 further comprises a center filler 8 located between the optical cable 5, a power wire 6, a grounding wire 7 and two coaxial cables 5. The optical cable 4, two coaxial cables 5, power wire 6 and grounding wire 7 are stranded together by the shielding layer 3. And the filler 8 disposed in the cable 100 is to keep a roundness of the optical-electrical hybrid transmission cable 100.

The shielding layer 3 is made of aluminum foil and wraps the optical cable 4, two coaxial cables 5, the power wire 6 and the grounding wire 7. The shielding layer 3 is not only to protect the signal transmission of the optical-electrical hybrid transmission cable 100 from external electromagnetic interference, but also to prevent the optical-electrical hybrid transmission cable 100 from radiating to the exterior.

The optical cable 4 comprises two optical fibers 41 arranged side by side and an insulative sheath 42 enclosing the two optical fibers 41. The optical cable 4 is used for optical signal transmission.

Figure 2:
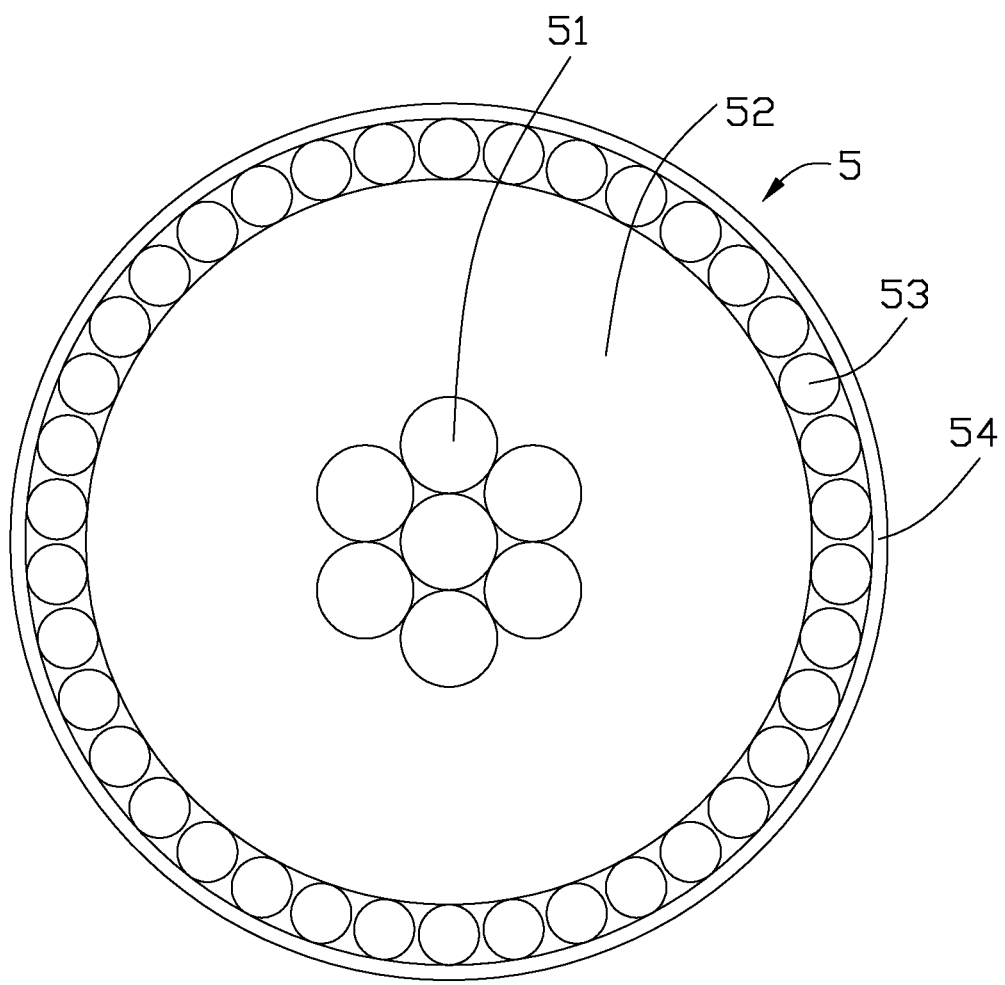
FIG. 2 is a cross-section view of a coaxial cable of the optical-electrical hybrid transmission cable of FIG. 1.

Referring to FIG. 2, each coaxial cable 5 comprises a plurality of copper wires 51 stranded together and disposed in a center thereof, an insulation 52 enclosing the copper wires 51, a shield 53 enclosing the insulation 52 and a jacket 54 enclosing the shield 53. The two coaxial cables 5 are arranged side by side.

Referring to FIG. 1, the power wire 6 includes a plurality of conductors 61 stranded together and an insulator 62 enclosing the plurality of conductors 61. The power wire 6 is main used for power transmitting.

The grounding wire 7 comprises a plurality of conductors 71 stranded together and an insulator 72 enclosing the plurality of conductors 71. Each coaxial cable 5, the power wire 6 and the grounding wire 7 are used for electrical signal transmission. The power wire 6 and the grounding wire 7 are spaced apart with each other by the optical cable 4, the filler 8 and the two coaxial cables 5

The filler 8 is formed by one strand fibers, in this embodiment, the filler 8 is made of Kevlar material. The filler 8 has a high tensile strength being disposed in a center of the optical-electrical hybrid transmission cable 100. The filler 8 is surrounded by the optical cable 4, the pair of coaxial cables 5, a power wire 6 and a grounding wire 7.

The pair of coaxial cables 5 are disposed on an inner side of the cable 100, and the optical cable 4 is disposed on another inner side of the cable 100. The pair of coaxial cables 5 and the optical cable 4 are spaced apart by the power wire 6 and the grounding wire 7. The pair of coaxial cables 5 are spaced apart with each other and arranged along a diametric direction of the cable 100.

As the optical-electrical hybrid transmission cable 100 transmitting not only electrical signal but also optical signal, so the data transmitting speed of the optical-electrical hybrid transmission cable 100 is higher than the cable only transmitting electrical signal. So, the optical-electrical hybrid transmission cable 100 can meet the high data transmitting rate requirements between the PC and PC or PC and PC and external device.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. An optical-electrical hybrid transmission cable, comprising:
   an insulative layer;
   a shielding layer located on an inner side of the insulative layer;
   an optical cable disposed in the shielding layer and comprising two optical fibers and an insulative sheath enclosing the two optical fibers;
   two coaxial cables, a power wire and a grounding wire disposed in the shielding layer; and a filler disposed in a center of the optical-electrical hybrid transmission cable and surrounded by the two coaxial cables, the power wire, the grounding wire and the optical cable which are arranged along a circumferential direction, wherein the power wire and the grounding wire are spaced apart with each other by the optical cable, the filler and the two coaxial cables.

2. The optical-electrical hybrid transmission cable as recited in claim 1, wherein each coaxial cable comprises a plurality of copper wires stranded together, an insulation enclosing the copper wires, a shield enclosing the insulation and a jacket enclosing the shield.

3. The optical-electrical hybrid transmission cable as recited in claim 2, wherein the optical cable defines two fibers disposed therein and arranged side by side.

4. The optical-electrical hybrid transmission cable as recited in claim 2, wherein the power wire comprises a plurality of conductors stranded together and an insulator enclosing the plurality of conductors.

5. The optical-electrical hybrid transmission cable as recited in claim 4, wherein the pair of coaxial cables and the optical cable are spaced apart by the power wire and the grounding wire.

6. The optical-electrical hybrid transmission cable as recited in claim 2, wherein the optical cable is used for optical signal transmission, the two coaxial cables, the power wire and the grounding wire are used for electrical signal transmission.

7. The optical-electrical hybrid transmission cable as recited in claim 2, wherein the filler is formed by one strand fibers and made of Kevlar material.

8. The optical-electrical hybrid transmission cable as recited in claim 1, wherein the pair of coaxial cables are disposed on an inner side thereof and the optical cable is disposed on another inner side thereof.

9. The optical-electrical hybrid transmission cable as recited in claim 1, wherein the power wire and the grounding wire are arranged along a diametric direction thereof.

10. A hybrid cable, comprising:
a filler disposed in a center thereof;
a shielding layer surrounding the filler;
an insulative layer surrounding the shielding layer; and
an optical cable, two coaxial cables, a power wire and a grounding wire disposed between the filler and the shielding layer and arranged along a circumferential direction,
wherein the two coaxial cable are arranged side by side.

11. The hybrid cable as recited in claim 10, wherein the optical cable has two optical fibers therein.

12. The hybrid cable as recited in claim 10, wherein the power wire and the grounding wire are spaced apart with other by the optical cable, the filler and the two coaxial cables.

13. A hybrid cable comprising:
an inner segment and an outer segment coaxially radially sandwiching a middle segment therebewteen;
the outer segment being of an insulative layer;
the middle segment being of at least one metallic layer for shielding; and
the inner segment including an optical cable, a plurality of signal wires and a plurality of power and ground wires commonly surrounding a filler,
wherein the inner segment is essentially symmetrically arranged with regard to an imaginary centerline,
wherein said signal wires, and said power and ground wires are respectively symmetrically arranged by two sides of said imaginary centerline while the optical cable is of a single piece with a peripheral portion proximately aligned with said centerline.

14. The hybrid cable as claimed in claim 13, wherein the filler is of a single piece and symmetrical with regard to said centerline.

15. The hybrid cable as claimed in claim 13, wherein the signal wires are coaxial wires each including an inner conductor enclosed by an insulation which is enclosed by a shield which is enclosed by an insulative jacket.

16. The hybrid cable as claimed in claim 13, wherein said optical cable includes a pair of optical fibers enclosed in a sheath.

* * * * *